J. R. NICHOLS.
Plows.

No. 136,257.

Patented Feb. 25, 1873.

UNITED STATES PATENT OFFICE.

JAMES R. NICHOLS, OF BASTROP, TEXAS.

IMPROVEMENT IN PLOWS.

Specification forming part of Letters Patent No. 136,257, dated February 25, 1873.

*To all whom it may concern:*

Figure 1:
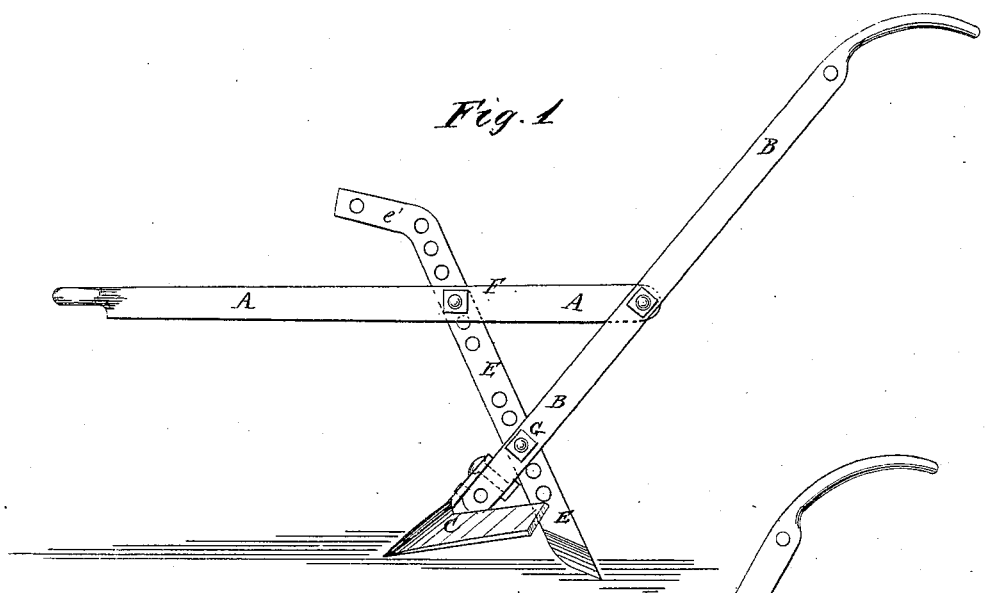
Figure 2:
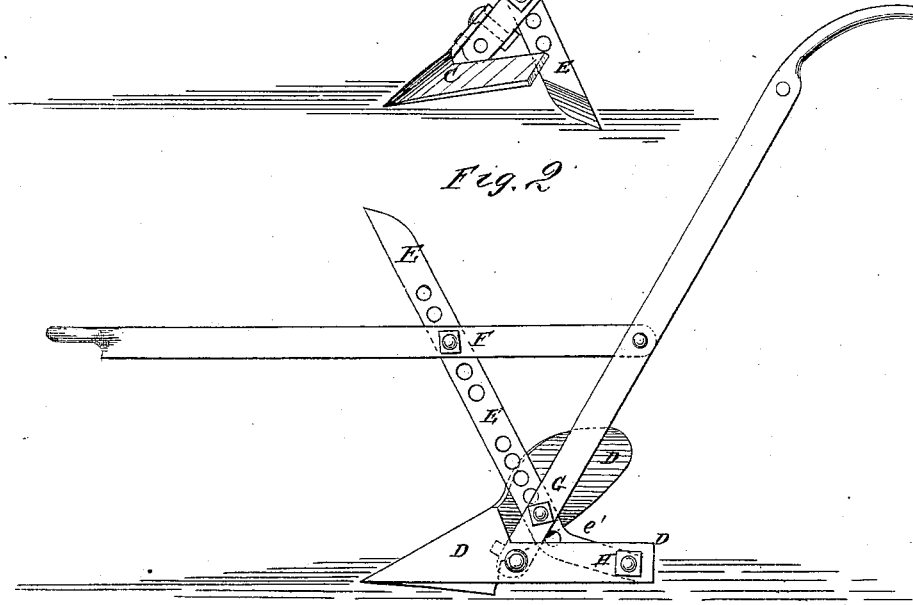

Be it known that I, JAMES R. NICHOLS, of Bastrop, in the county of Bastrop and State of Texas, have invented a new and useful Improvement in Plows, of which the following is a specification:

Figure 1 is a side view of a shovel-plow illustrating my invention. Fig. 2 represents the improvement as applied to a turn-plow.

The invention consists in a plow-cutter constructed and applicable as hereinafter described and claimed.

A is the plow-beam, to the forward end of which the draft is applied, and its rear end is pivoted to the handles B by a bolt, as shown in Figs. 1 and 2. The lower ends of the handles serve as a standard to receive the plow, which may be a sweep, as shown in Fig. 1, or turn-plow, as shown in Fig. 2, or any other desired kind of plow. The beam A and the handles and standard B may be made of iron or of wood, and may be of any desired construction. E is the cutter, which passes through a slot or mortise in the beam A, where it is secured in place by a bolt, F, and between the lower parts of the handles or through a mortise in the standard B, where it is secured in place by a bolt, G; several holes are formed in the cutter E to receive the bolts F G, so that the bar or cutter may be readily adjusted, as required. One or both ends of the cutter E are beveled and sharpened, as shown in Figs. 1 and 2, so that it may enter the ground in the bottom of the furrow, and thus give steadiness to the plow, and cause it to be more readily controlled. When the cutter E is to be used with a turn-plow, a bend, $e'$, is formed upon one of its ends, which projects to the rearward, and has a hole formed in it to receive the bolt H, by which it is secured to the land-side or shoe of the plow D, as shown in Fig. 2. By simply moving the beam A up or down upon the cutter E, the plow will be adjusted to work deeper or shallower in the ground, as may be desired.

Having thus described my invention, I claim as new and desire to secure by Letters Patent—

The plow-cutter E having bend $e'$ at one end, sharpened at the other, and perforated at different points, as described, to adapt it to be used with a sweep or plow, in the manner described.

J. R. NICHOLS.

Witnesses:
    THOS. C. CAIN,
    J. L. DELANY.